(12) United States Patent
Thiruvasagam et al.

(10) Patent No.: US 9,424,243 B1
(45) Date of Patent: Aug. 23, 2016

(54) MECHANISM TO SUPPORT COMPOSITE DATA MODELS IN HTML FORM

(71) Applicant: EMC Corporation, Hopkinton, MA (US)

(72) Inventors: Rajakumar Thiruvasagam, Bangalore (IN); Sachin G. Totale, Bangalore (IN); Yuhui Zhao, San Jose, CA (US); Julian M. Hjortshoj, Boston, MA (US); Ramkumar Ganesan, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 424 days.

(21) Appl. No.: 13/724,422

(22) Filed: Dec. 21, 2012

(51) Int. Cl.
*G06F 17/00* (2006.01)
*G06F 17/24* (2006.01)

(52) U.S. Cl.
CPC .................................... *G06F 17/243* (2013.01)

(58) Field of Classification Search
CPC ........................... G06F 17/243; G06F 17/2725
USPC .................... 715/200, 221, 222, 226, 234
See application file for complete search history.

(56) References Cited

U.S. PATENT DOCUMENTS

| | | | |
|---|---|---|---|
| 6,493,717 B1 * | 12/2002 | Junkin | 707/754 |
| 6,571,285 B1 * | 5/2003 | Groath et al. | 709/223 |
| 6,985,901 B1 * | 1/2006 | Sachse et al. | |
| 2004/0268238 A1 * | 12/2004 | Liu et al. | 715/513 |
| 2006/0015839 A1 * | 1/2006 | Owens et al. | 717/100 |
| 2006/0030292 A1 * | 2/2006 | Bosworth et al. | 455/408 |
| 2006/0031256 A1 * | 2/2006 | Bosworth et al. | 707/104.1 |
| 2008/0082959 A1 * | 4/2008 | Fowler | 717/104 |
| 2009/0210631 A1 * | 8/2009 | Bosworth et al. | 711/141 |

* cited by examiner

*Primary Examiner* — Stephen Hong
*Assistant Examiner* — Gregory J Vaughn
(74) *Attorney, Agent, or Firm* — Van Pelt, Yi & James LLP

(57) ABSTRACT

Techniques to process a form are disclosed. An attribute associated with a child data model is recognized in a first set of form data associated with a form an attribute associated with a child data model. A data value associated with the attribute is used to obtain a second set of form data associated with the child data model. The second set of form data is associated with the form.

22 Claims, 8 Drawing Sheets

MECHANISM TO SUPPORT COMPOSITE DATA MODELS IN HTML FORM

BACKGROUND OF THE INVENTION

In web 2.0 applications, JSON is one of the supported data exchange formats between the client and server (e.g. REST services). The server serializes complex data models (e.g. Java object) into the JSON data. In the client (e.g. Web Browser) the JSON data gets transformed into client data model objects (e.g. JavaScript objects).

Typically, the client model objects are used to display the data in the HTML page. The data may be displayed as read-only or may be populated into an editable HTML form.

In the classical mechanism, HTML form fields are associated to a single level data model (e.g. JavaScript object). Changes made to form fields at the client can be "submitted", which results in the data model changes being sent back to the server. However, currently there is no known mechanism for HTML form fields to be associated to composite data models. The composite data model groups multiple data models in a parent-child relationship. Additionally there is no known mechanism to submit (i.e., to a server) a composite data model associated with a single HTML form.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to provide composite data model support for HTML forms are disclosed. In various embodiments, N level nesting of parent-child relationships is supported. The parent-child relationship is established using a field (attribute) in the parent data model. This field is of a custom type that identifies the field as one that defines and represents a parent-child relationship. In various embodiments, a dotted notation is used to express and/or communicate the parent-child relationship(s) that define an attributes place within a hierarchical composite data model. In some embodiments, dynamic and/or lazy loading of child objects of a composite data model is provided.

Figure 1:
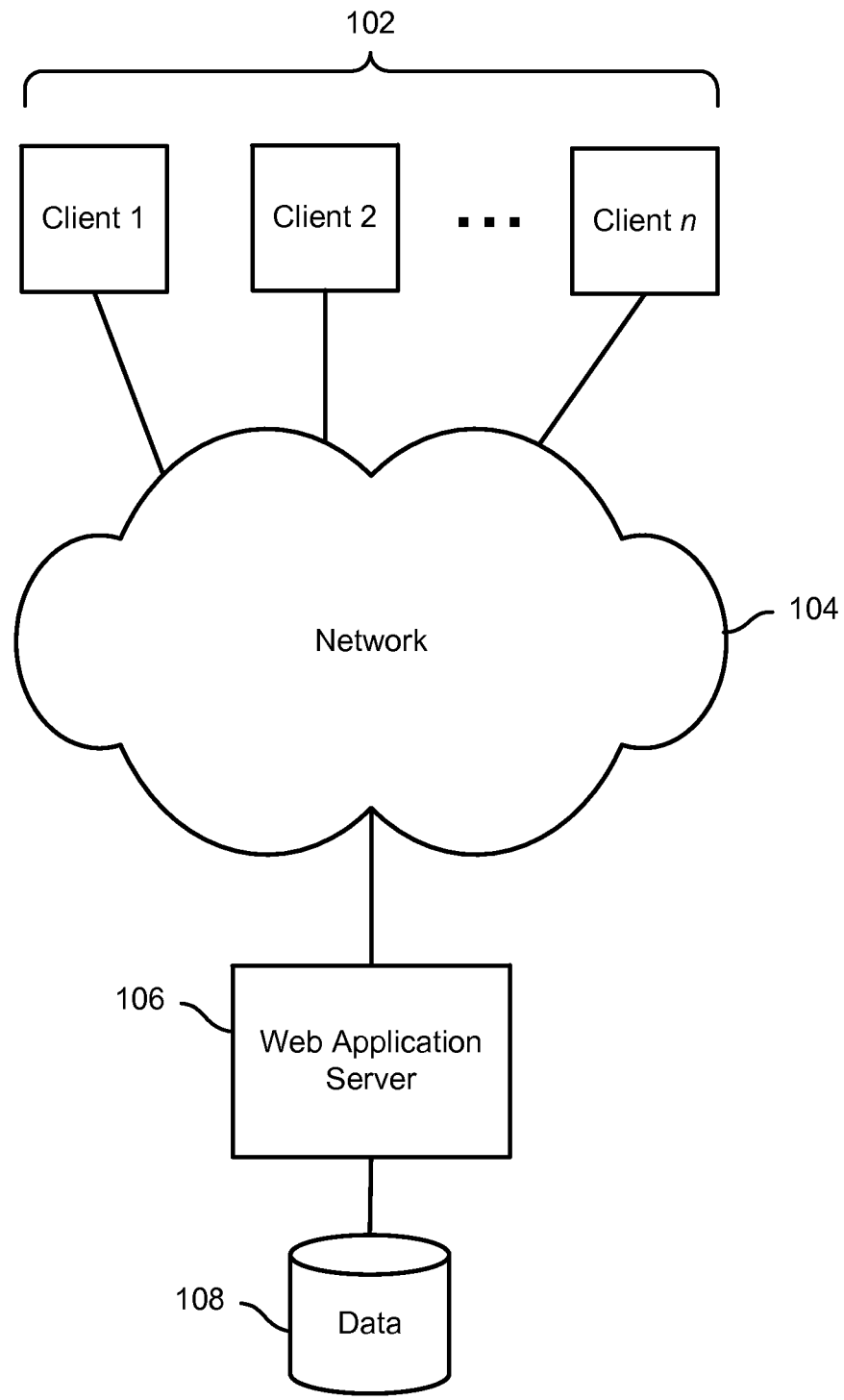
FIG. 1 is a block diagram illustrating an embodiment of an environment in which a system to provide support for composite data models in HTML forms may operate.

FIG. 1 is a block diagram illustrating an embodiment of an environment in which a system to provide support for composite data models in HTML forms may operate. In the example shown, a plurality of client systems 102 connect via the Internet 104 with a remote web application server 106. The server 106 in various embodiments uses composite data models (e.g., Java objects) comprising data stored in a data store 108 to satisfy requests from clients 102 to load data associated with HTML form or other page associated with a composite data model.

Figure 2:
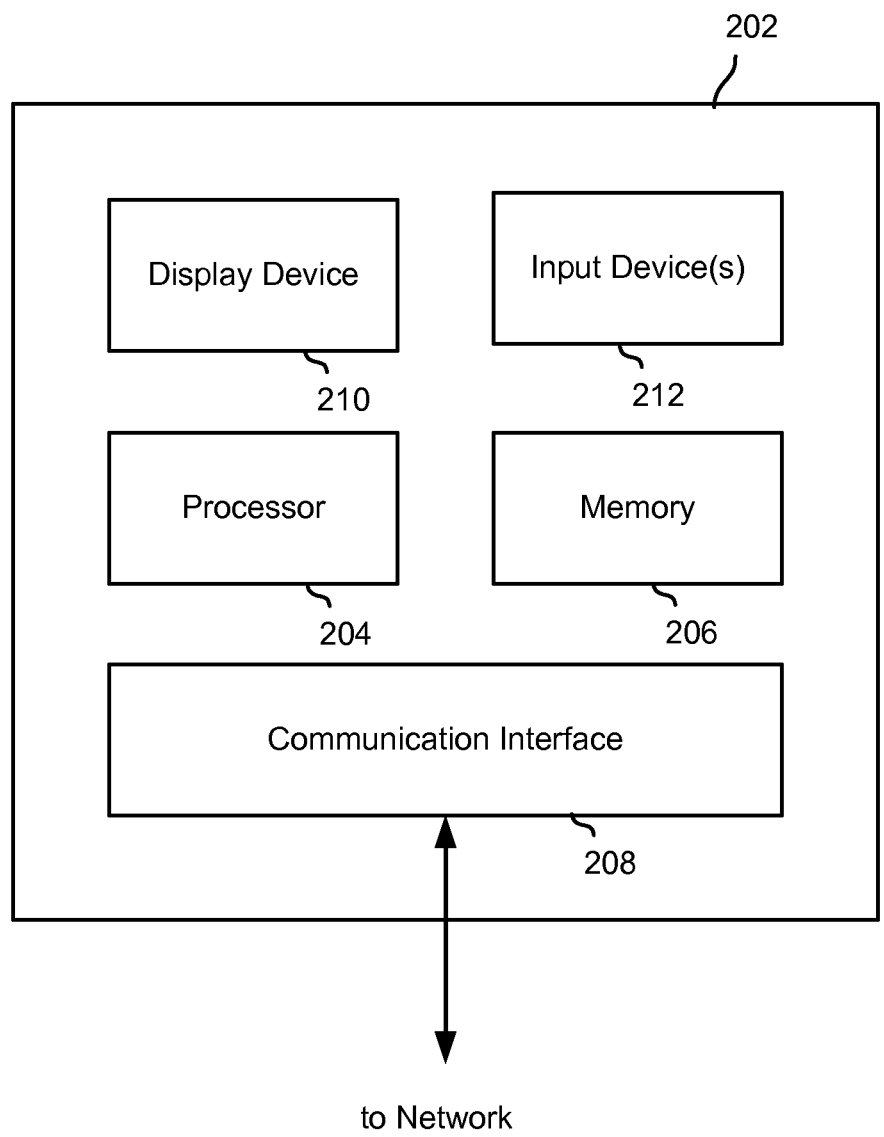
FIG. 2 is a block diagram illustrating an embodiment of a system to provide support for composite data models in HTML forms.

FIG. 2 is a block diagram illustrating an embodiment of a system to provide support for composite data models in HTML forms. In the example shown, the client system 202 (corresponding, for example, to clients 102 of FIG. 1) includes a processor 204 and a memory and/or other storage device 206. In various embodiments, the processor 204 executes instructions stored in memory 206 and/or operates on composite data model data stored in memory 204. Processor 204 is coupled to communication interface 208, e.g., a network interface card (NIC) or other interface, which provides connectivity via a network, e.g., the Internet, with remote servers. The client system 202 includes a display device 210 used in various embodiments to display to a user an HTML form as disclosed herein, and one or more input devices 212, e.g., a hard and/or soft keyboard, mouse, touch screen, or other input device, usable for example to receive user input entered into user-selected HTML form fields.

Figure 3:
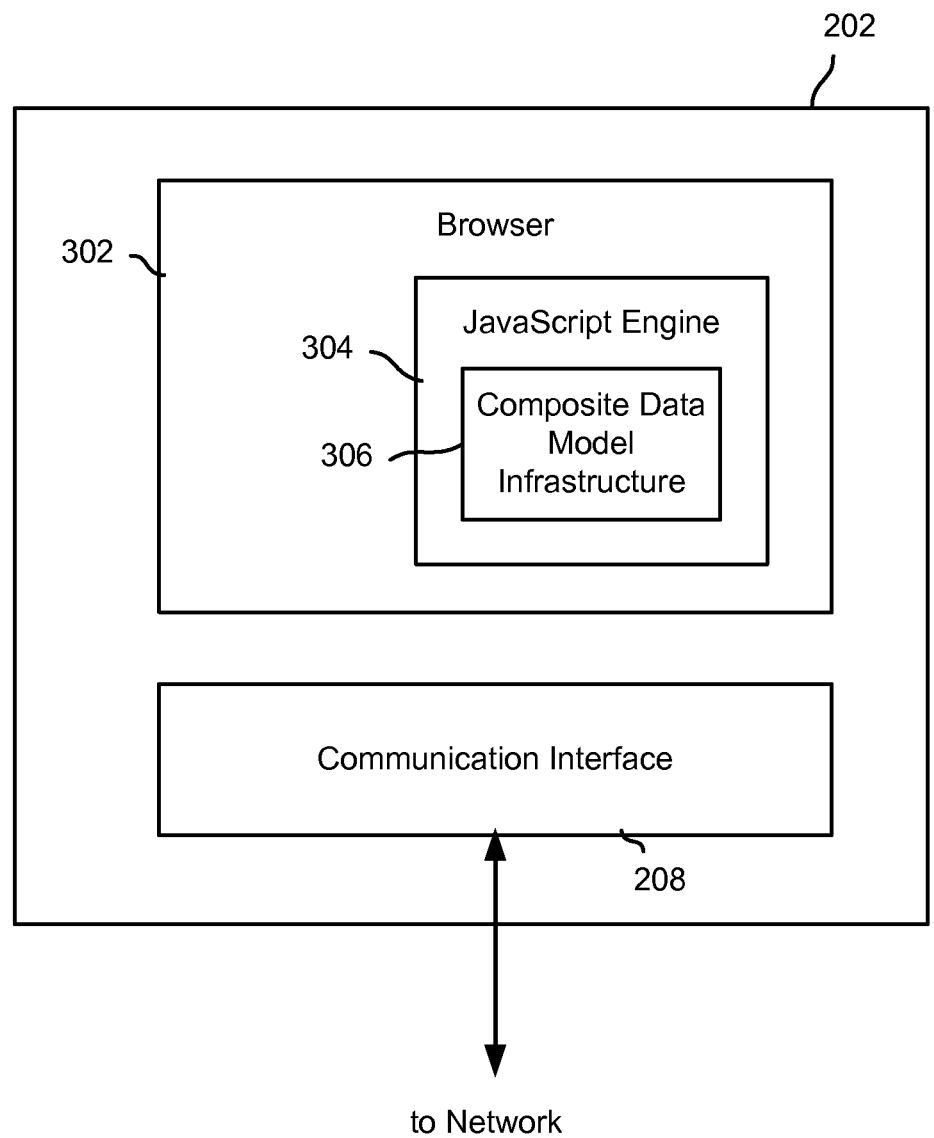
FIG. 3 is a block diagram illustrating an embodiment of a system to provide support for composite data models in HTML forms.

FIG. 3 is a block diagram illustrating an embodiment of a system to provide support for composite data models in HTML forms. In the example shown, client system 202 of FIG. 2 is running a browser software instance 302, configured to download web pages via network communications, such as HTTP GET or other requests, sent via communication interface 208. Browser 302 includes a JavaScript engine 304, which in the example shown is being used to provide a composite data model infrastructure 306. For example, in some embodiments, a web page retrieved by browser 302 which contains and/or is associated with an HTML form with which a composite data model is associated may include and/or be configured to download JavaScript code to provide the composite data model infrastructure 306. In various embodiments, when browser 302 retrieves and loads an HTML form associated with a composite data model, composite data model infrastructure 306 is used to load the composite data model and merge associated data into a single level data model of the HTML form as rendered by the browser. In various embodiments, composite data model infrastructure 306 recognizes a field of a parent model as being of a type that indicates the field references a child model, and retrieves the child model from the server, recursively until all objects comprising the composite data model have been retrieved and merged into the HTML form data model. In various embodiments, when the form is submitted, composite data model infrastructure 306 sends data values to the server, using in some embodiments a dotted notation to represent and communicate a location of each attribute within the composite data model.

Figure 4:
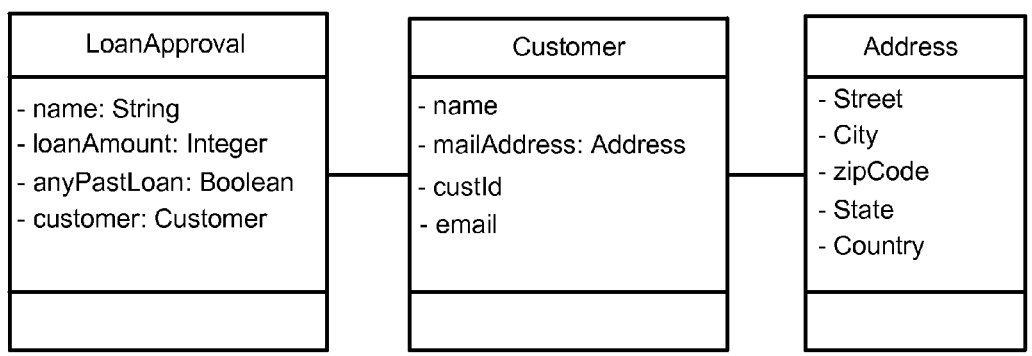
FIG. 4 is a block diagram illustrating an example of a composite data model.

FIG. 4 is a block diagram illustrating an example of a composite data model. In the example shown, a parent object "LoanApproval" includes four attributes, three of standard types (String, Integer, Boolean) and a fourth of type "Customer", which in this example indicates a parent-child relationship to a child data model "Customer". For example, a customer id or other data value of the attribute "customer" may identify a particular instance of the child data model "Customer" which is associated with the composite data model of a particular loan approval instance. The "Customer" child data model includes four attributes, as shown, including a "mailAddress" attribute of a type that indicates a parent-child relationship to a child data model "Address". As can be seen, the approach illustrated in FIG. 4 would support any number of levels of child data model relationships.

Figure 5:
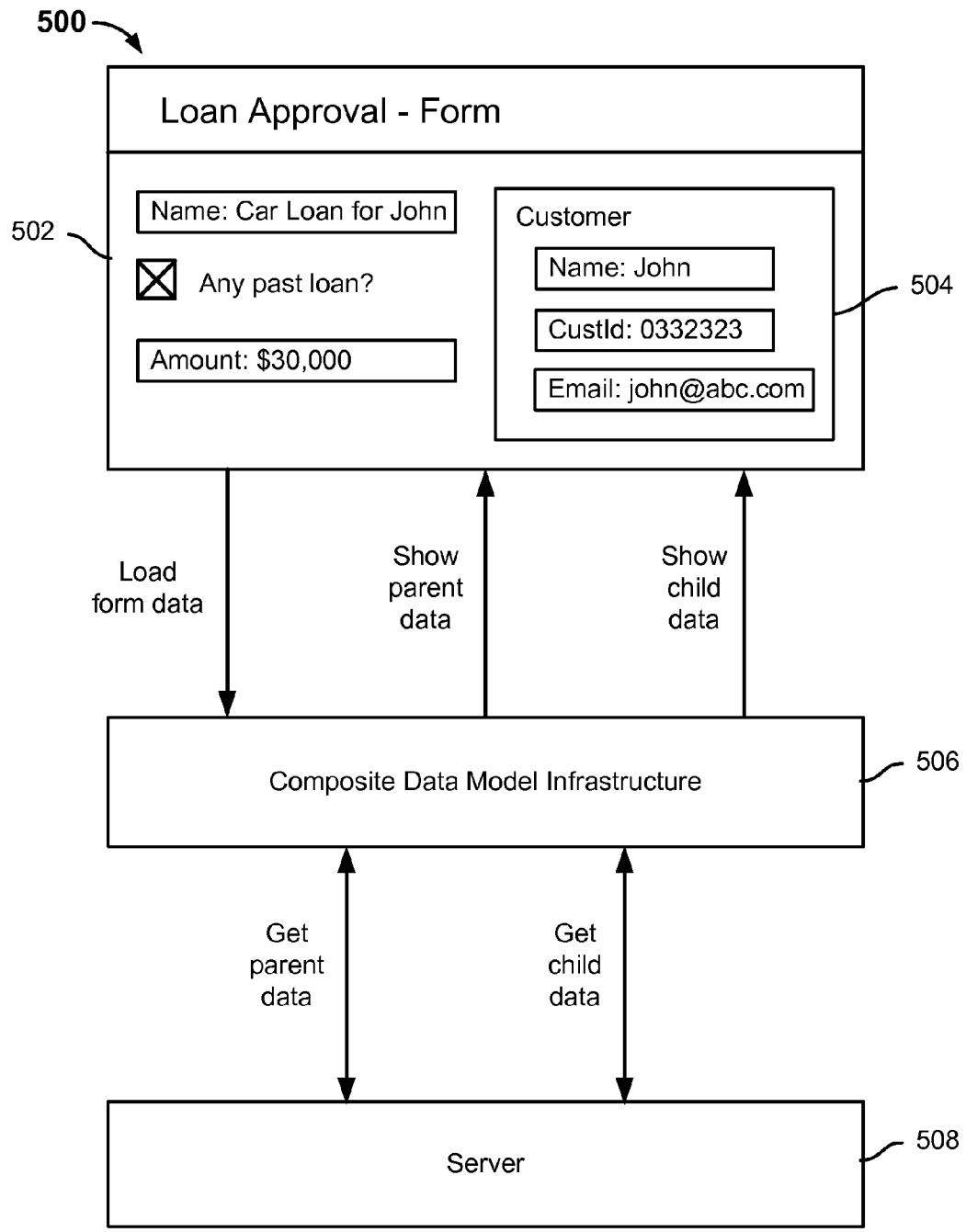
FIG. 5 is a block diagram illustrating an embodiment of a system to provide support for composite data models in HTML forms.

FIG. 5 is a block diagram illustrating an embodiment of a system to provide support for composite data models in HTML forms. In the example shown, a loan approval form 500 includes in the state shown a parent data model display region 502 and a child data model display region 504. In some embodiments, child data models are loaded dynamically (e.g., lazily), for example, as parent data model attributes that identify child data models are encountered and/or as a user interacts with a portion of the form that requires the child data model to be retrieved. In the example shown in FIG. 5, and referring to the composite data model shown in FIG. 4, an indication to load form data for the loan approval form 500 is received at composite data model infrastructure 506 (e.g., composite data model infrastructure 306 of FIG. 3). The composite data model infrastructure 506 gets the parent data from the server 508, and uses the received data to show the parent data values (in this case the loan approval instance "name", which is "Car Loan for John" in this example; the indication whether there is "Any past loan", which is "true" in this example; and the loan amount, i.e., $30,000. The fourth attribute is recognized by composite data model infrastructure 506 as indicating a child data model, the specific instance of which is identified by a value of the child data model-indicating attribute "customer". The composite data model infrastructure 506 uses the attribute value, e.g., a customer identifier, to get the child data from server 508 and to show the child data in the form 500. In this example, the child data of the child data model of type "Customer" is shown to include name, customer id, and email address fields.

In some embodiments, the parent model, in the example shown in FIGS. 4 and 5 the "LoanApproval" model, references the customer model as field 'customer'. Consider the following payload from the server for the loan approval data:

```
{
    "name":"sample workflow",
    "customer": {
    "custId":"09b34242424",
    },
    "loanAmount":100000,
    "anyPastLoan":false
}
```

The 'customer' field which refers to customer model has the 'custId' attribute, which in this example can be used to fetch the customer data from the server. In some embodiments, the server may return the following payload for the customer model:

```
{
    "custId":"09b34242424",
    "name":"Joe",
    "mailAddress": {
    "id":"09b3453424"
    }
}
```

The customer model above in various embodiments would be instantiated and inserted into the loan approval model. In some embodiments, the loading of a child object of the customer model, such as the "mail address" model in the example shown in FIG. 4, would happen only when the address model fields were referred by the HTML form. As a result, the "mail address" model (or any other child model) would only be loaded if and/or when needed to render the HTML form.

Figure 6:
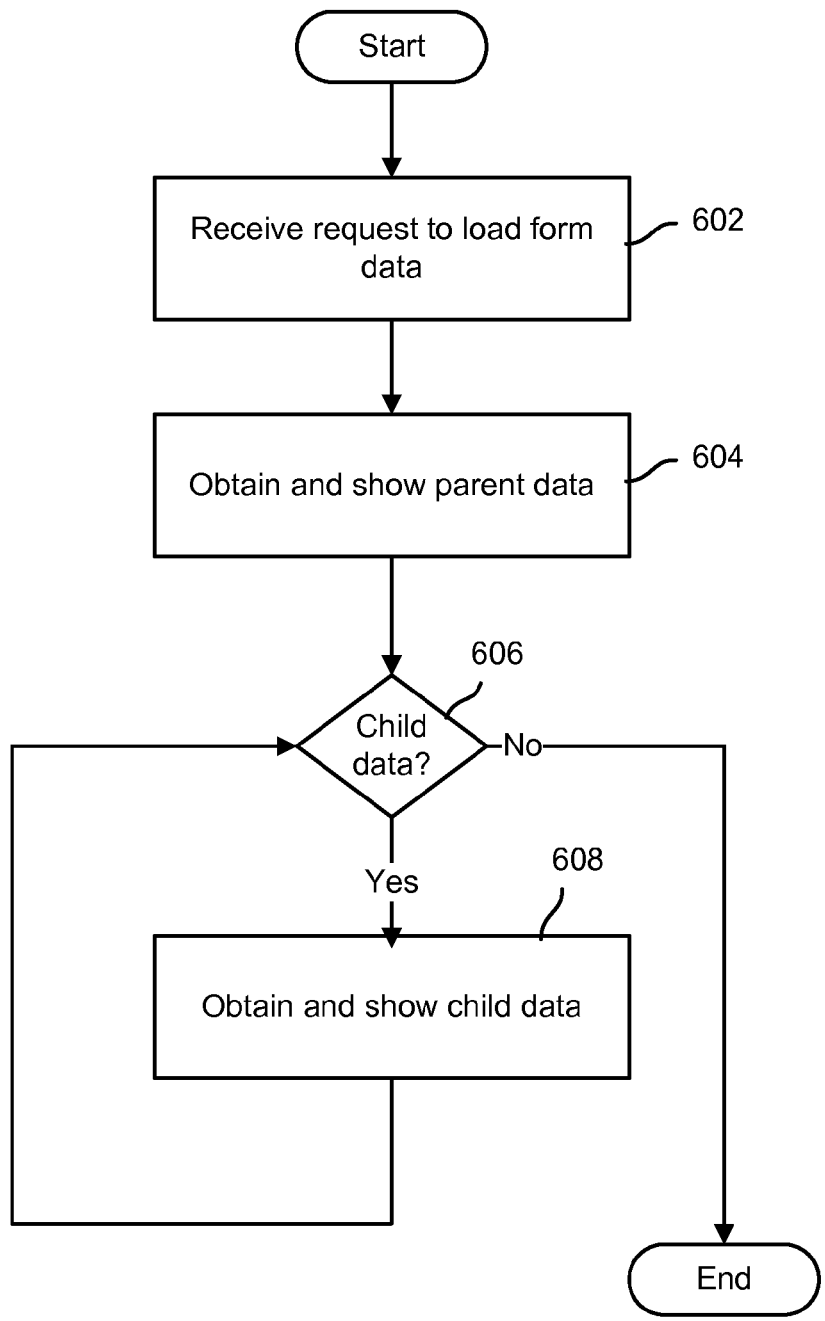
FIG. 6 is a flow chart illustrating an embodiment of a process to associate a composite data model to an HTML form.

FIG. 6 is a flow chart illustrating an embodiment of a process to associate a composite data model to an HTML form. In some embodiments, a client side component, such as composite data model infrastructure 306 or 506, implements the process of FIG. 6. In the example shown, a request to load form data is received (602). Parent data model data is obtained and displayed (604). If the parent data includes an attribute of a type that indicates a child model (606), the child data is obtained from the server and displayed to the user (608). The retrieval and display of child data model data (606, 608), if present, is performed recursively until no further child nodes are found.

In various embodiments, a dotted notation is used to refer to form fields by name in a manner that expresses applicable parent-child relationships. For example, the HTML form field may be associated to the composite data models as follows using ExtJs configuration:

```
{
    "type": "text_input",
    "id":"uicomp_2_1318484253422",
    "name": "loan_approval.customer.name",
    "fieldLabel": "Name"
}
```

In the above example, the name attribute of the form field is used to express the binding of that field to the composite data model. Specifically, the expression "loan_approval.customer.name" is used to identify the "name" attribute as a field of the "customer" child data model of the "loan_approval" parent data model.

In various embodiments, data model fields values can be set or obtained using the dotted notation, e.g., as follows:

Set value pseudo code: loan_approval.set("customer.name", "TIGER")

Get value pseudo code: loan_approval.get("customer.mailAddress.street")

In various embodiments, as the child model data gets loaded, it gets merged into the parent data model. Thus all the user inputs to the form are recorded into the parent model which gets submitted on form submission. At the server, the dotted notation is interpreted to associate submitted data values to corresponding attributes in the composite data model.

Figure 7:
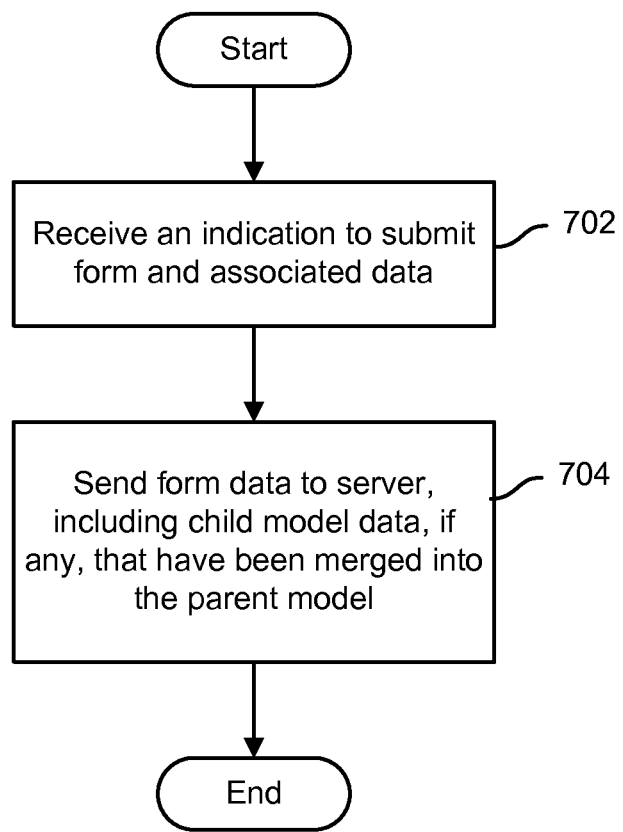
FIG. 7 is a flow chart illustrating an embodiment of a process to submit an HTML form associated with a composite data model.

FIG. 7 is a flow chart illustrating an embodiment of a process to submit an HTML form associated with a composite data model. In various embodiments, the process of FIG. 7 is implemented on a client system and is performed upon receipt of a user input requesting form submission. In the example shown, an indication to submit an HTML form is received (702), for example, the user selects a "submit" or similar button. The form data is sent to the server, including any child model data that has been merged into the parent model to display (704). In some embodiments, child data fields are referred to using a dotted notation, as in the examples above, to specify the relationship of each field to the composite data model.

Figure 8:
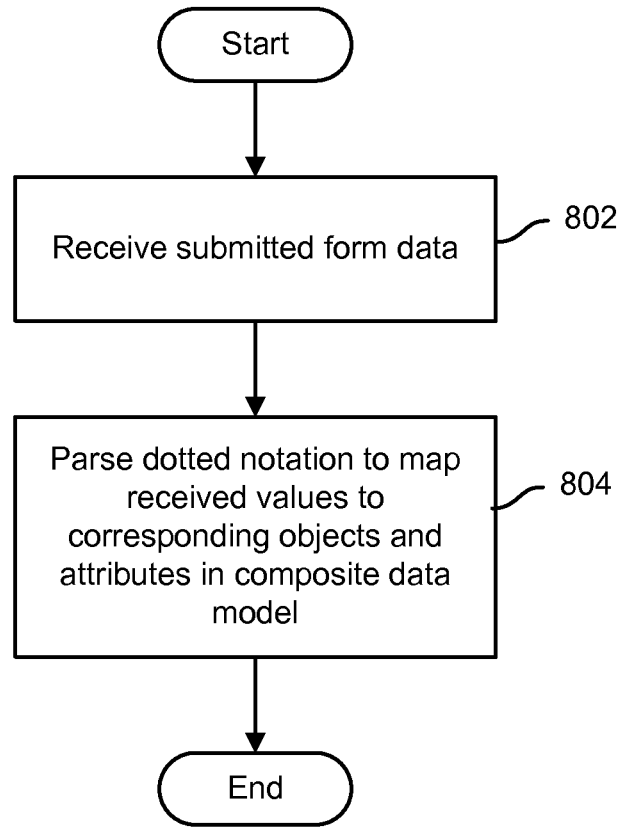
FIG. 8 is a flow chart illustrating an embodiment of a process to receive a submitted HTML form associated with a composite data model.

FIG. 8 is a flow chart illustrating an embodiment of a process to receive a submitted HTML form associated with a composite data model. In various embodiments, the process of FIG. 8 is implemented on a server to which an HTML form has been submitted. In the example shown, submitted form data is received (802). The dotted notation is parsed to map received values to corresponding attributes in the associated composite data model at the server (804).

Using techniques disclosed herein, inherent support of composite data models is provided for HTML forms. Seamless binding of composite data model attributes to form fields is provided. Dynamic and/or lazy loading of client data models is supported. Transparent data exchange between the client and server is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing a form, comprising:
recognizing in a first set of form data of a parent data model an attribute associated with a child data model, wherein the attribute is recognized as being associated with the child data model based at least in part on a field of the parent data model that indicates the field references the child data model, wherein the form is displayed in a browser and a parent object is displayed in a parent data model display region of the form;
using a data value associated with the attribute associated with the child data model to obtain a second set of form data associated with the child data model, wherein the second set of form data is obtained at least in part in response to a user interacting with a child object displayed in a child data model display region of the form; and
associating the second set of form data with the form, wherein the associating the second set of form data with the form includes merging the second set of form data into the parent data model so as to bind composite data model attributes to form fields.

2. The method of claim 1, further comprising requesting the first set of form data from the server.

3. The method of claim 2, further comprising receiving the first set of form data from the server.

4. The method of claim 2, wherein the request is sent in response to an indication to load the form.

5. The method of claim 1, wherein associating the second set of form data with the form includes identifying a form field with which a data value in the second set of form data is associated using a prescribed format that expresses a parent-child relationship between the parent data model with which the first set of form data is associated and the child data model with which the second set of form data is associated.

6. The method of claim 5, wherein the prescribed format comprises a dotted notation format.

7. The method of claim 6, wherein the dotted notation format is of a form <parent data model>.<child data model>.<field name>.

8. The method of claim 1, wherein the attribute is recognized as being associated with the child data model based at least in part on a type information associated with the field.

9. The method of claim 1, wherein the second set of form data is obtained dynamically at least in part in response to the attribute associated with the child data model being encountered in the course of rendering the form.

10. The method of claim 1, wherein the form comprises an HTML form.

11. The method of claim 10, wherein the merging the second set of form data into the parent data model so as to bind composite data model attributes to form fields includes merging the second set of form data into a single level data model of the HTML form in a manner that preserves an awareness of a parent-child relationship between the first set of form data and the second set of form data.

12. The method of claim 1, further comprising receiving an indication to submit the form and sending to a server a first set of current values associated with the first set of form data and a second set of current values associated with the second set of form data.

13. The method of claim 1, further comprising:
receiving an input to the form;
recording the input to the form to the parent data model; and
in response to receiving a form submission request, sending, to a server, the form data including the first set of form data and the second set of form data merged into the parent data model using a format that is indicative of the relationship of each field child data field of the second set of form data to a composite data model.

14. The method of claim 1, wherein using the data value associated with the attribute to obtain the second set of form data associated with the child data model includes at least recursively obtaining and displaying data of the child data model until no further child nodes are found.

15. A computer system, comprising:
a communication interface; and
a processor coupled to the communication interface and configured to:
recognize in a first set of form data of a parent data model an attribute associated with a child data model, wherein the attribute is recognized as being associated with the child data model based at least in part on a field of the parent data model that indicates the field references the child data model, wherein a form is displayed in a browser and a parent object is displayed in a parent data model display region of the form;
use a data value associated with the attribute associated with the child data model to obtain, through a request sent via the communication interface, a second set of form data associated with the child data model, wherein the second set of form data is obtained at least in part in response to a user interacting with a child object displayed in a child data model display region of the form; and associate the second set of form data with the form, wherein the associating the second set of form data with the form includes merging the second set of form data into the parent data model so as to bind composite data model attributes to form fields.

16. The system of claim 15, wherein the processor is further configured to request the first set of form data from a server.

17. The system of claim 15, wherein the processor is configured to associate the second set of form data with the form at least in part by identifying a form field with which a data value in the second set of form data is associated using a prescribed format that expresses a parent-child relationship between the parent data model with which the first set of form data is associated and the child data model with which the second set of form data is associated.

18. The system of claim 15, wherein the processor is configured to recognize that the attribute is associated with the child data model based at least in part on a type information associated with the field.

19. The system of claim 15, wherein the second set of form data is obtained dynamically at least in part in response to the attribute associated with the child data model being encountered in the course of rendering the form.

20. The system of claim 15, wherein the processor is further configured to receive an indication to submit the form and send to a server a first set of current values associated with the first set of form data and a second set of current values associated with the second set of form data.

21. The system of claim 20, wherein the second set of current values are sent in a manner that expresses a parent-child relationship between the parent data model with which the first set of form data is associated and the child data model with which the second set of form data is associated.

22. A computer program product to process a form, the computer program product being embodied in a non-transitory tangible computer readable storage medium and comprising computer instructions for:

recognizing in a first set of form data of a parent data model an attribute associated with a child data model, wherein the attribute is recognized as being associated with the child data model based at least in part on a field of the parent data model that indicates the field references the child data model, wherein the form is displayed in a browser and a parent object is displayed in a parent data model display region of the form;

using a data value associated with the attribute associated with the child data model to obtain a second set of form data associated with the child data model, wherein the second set of form data is obtained at least in part in response to a user interacting with a child object displayed in a child data model display region of the form; and associating the second set of form data with the form, wherein the associating the second set of form data with the form includes merging the second set of form data into the parent data model so as to bind composite data model attributes to form fields.

\* \* \* \* \*